Oct. 30, 1962 S. E. GRAF ETAL 3,061,454
MAGNETIC COATING TRANSFER MEDIUM
Filed July 28, 1960
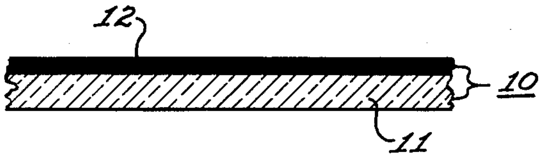
Fig. 1
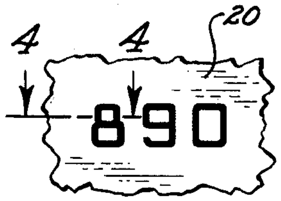
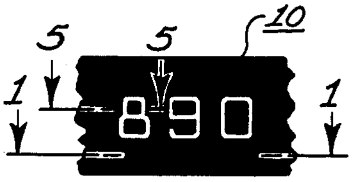
Fig. 2 Fig. 3
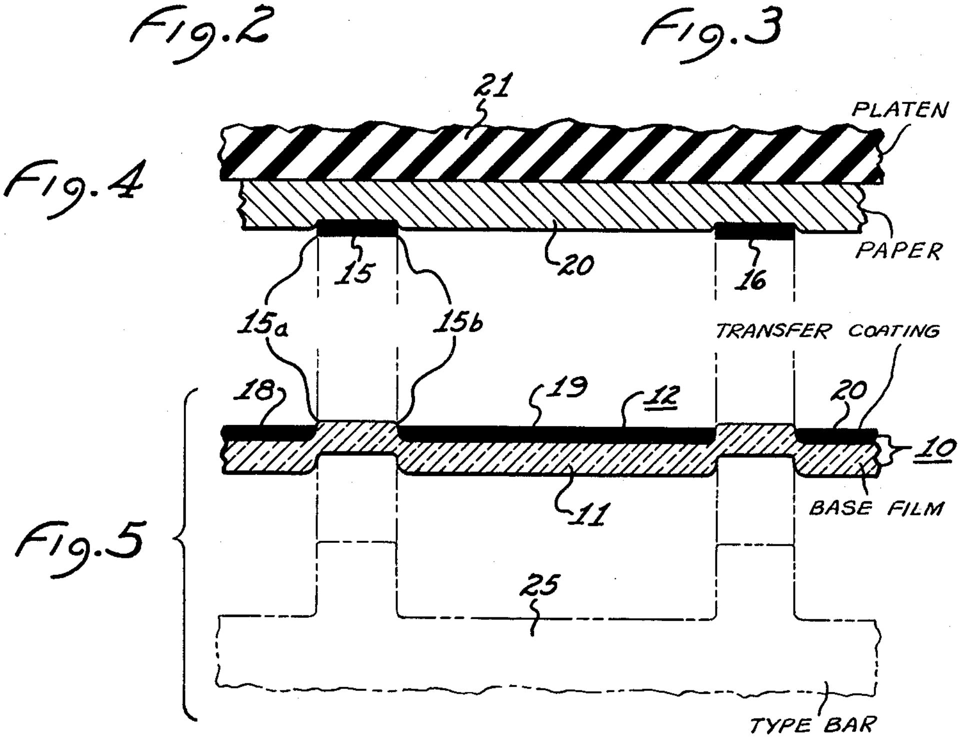
Fig. 4 Fig. 5
INVENTORS.
SAMUEL E. GRAF AND
BY MARIAN F. HIRSCH.
Howard M. Dustin

3,061,454
MAGNETIC COATING TRANSFER MEDIUM

Samuel E. Graf, Atherton, and Marian F. Hirsch, Menlo Park, Calif., assignors to General Electric Company, a corporation of New York Filed July 28, 1960, Ser. No. 46,873
4 Claims. (Cl. 117—36.1)

The present invention relates to transfer media and particularly to media composed of a base film and a smudge-proof transfer coating composed of a mixture of materials which exert adhesive and cohesive forces of such magnitudes relative to each other that a complete and sharply defined transfer to the coating may be effected.

This application is a continuation-in-part of U.S. patent application S.N. 707,886, now abandoned, filed January 9, 1958, which, in turn is a continuation-inpart of U.S. patent application S.N. 590,357, now abandoned, filed June 11, 1956.

In an application for Magnetic Ink, by Charles B. Clark, filed February 8, 1955, S.N. 486,985, now abandoned, which is assigned to a common assignee, there is described and claimed a novel ink which has magnetic properties. That invention arose as a result of the requirement for presenting data which has been written in human language in a form which is capable of being automatically read or converted into machine language. Such reading must be rapid and accurate. The data can then be directly entered into information-handling equipment by apparatus which senses the waveforms generated from various symbols and converts these to a machine code. The word symbol, as used throughout this specification, is intended to include the letters of the alphabet, numerals, signs such as $, *, ////, # and any other symbolic representation.

The printing of data in human language, which can be read by electrical apparatus, enables visual checking for the correctness of the data being read into the apparatus, and thus eliminates considerable equipment normally employed to verify the data which has been put in a form, such as a code on magnetic tape, for subsequent presentation to reading and data processing apparatus. Since a great deal of printing machinery used with data processing equipment is not of the printing-press type, but rather on the order of the typewriter, listing machine or the like, a magnetic ink is not particularly suitable for utilization with these types of apparatus. As is well known, the typewriter uses either ribbon or carbon or transfer paper for the purpose of printing.

Magnetic transfer papers such as described in U.S. Patent No. 2,744,031 have been developed for use in typewriters in a manner customarily employing ordinary carbon paper except that the transfer impression on the paper contains magnetic material instead of carbon black or similar materials.

It has been found, however, with this type of magnetic transfer paper, that the amount of material transferred would vary, for example, with variations in pressure of the typewriter key which was used for the purpose of effecting the transfer. Although the apparatus for reading the symbols printed with magnetic material has circuitry for compensating for such variations to a limited degree, it is much more desirable to reduce error possibilities by providing as uniformly printed symbols as possible.

Another problem which arose in connection with the above type of transfer paper was that the printed material could be easily smudged. This also tended to destroy uniformity of the symbols so that accurate machine reading of these symbols became more difficult and in some cases impossible. In practice, the problem of smudging becomes one of great importance, particularly in magnetic reading of commercial paper, such as bank checks which are handled over and over again and repeatedly passed through paper sorters and reading apparatus. The smudging in such cases wiped the magnetic material off of the symbols thereby reducing the electrical signals used to recognize the symbol and deposited the wiped-off material on the adjacent areas of the paper thereby decreasing the signal-to-noise ratio. Aside from the desire of obtaining uniformly printed symbols which would produce correspondingly uniform electrical signals, it is considered generally desirable to produce a transfer medium that provides a smudge-proof copy, regardless of whether the copy is to be read magnetically by electrical apparatus or visually by the eye.

It is therefore an object of the present invention to provide an improved transfer medium whereby the transfer of the coating material of the medium to the base stock of a print copy is substantially complete.

It is another object of the invention to provide a substantially smudge-proof transfer medium.

It is a further and more specific object of the invention to provide an improved transfer medium which, upon impact or application of pressure by a printing element, will enable a sharply defined separation of the impact or pressure area of the transfer coating from the body of said coating and adhesion of said area to the base stock of a print copy.

It is a further object of the invention to provide a transfer medium which enables the deposit of a substantially uniform layer of the transfer coating upon the paper to which the coating is to be transferred from the transfer medium.

While the novel and distinctive features of the invention are particularly pointed out in the appended claims, a more expository treatment of the invention, in principle and detail, together with additional objects and advantages thereof, is afforded by the following description and accompanying drawings of representative elements in which:

FIG. 1 is an enlarged longitudinal section of the transfer medium constituting the present invention, taken along line 1—1 of FIG. 3.

FIG. 2 is an enlarged fragmentary view of a document upon which symbols are printed.

FIG. 3 is an enlarged fragmentary view of the transfer medium as it appears after the symbols have been transferred to the document shown in FIG. 2.

FIG. 4 is a greatly enlarged section view of the printed document, taken on the line 4—4 of FIG. 2.

FIG. 5 is a greatly enlarged sectional view of the transfer medium, taken on the line 5—5 of FIG. 3. FIG. 5 also includes a representation, in cross section and by phantom lines, of a type bar or printing element by which the transfer is effected.

The transfer medium 10 (FIG. 1) includes a film backing 11 comprising a polyester material and a transferable coating 12. Preferably, the film backing material may comprise a polyester having a melting point above 190° C. which is mutually insoluble with the transferable coating material. An example of such a polyester material is Mylar (polyethylene terephthalate) produced and marketed by the Du Pont Company.

The film stock is coated with a mixture of magnetic material, polyethylene as a base vehicle with oils and waxes, specified hereinafter, to plasticize or add to the flow of the coating when heated. The mixture is heated to a temperature of approximately 250° F. and a coating of substantially uniform thickness is applied to the base film stock by any one of various well known methods. The coating solidifies at approximately 200° F.

The transfer medium of the present invention may be used as a ribbon or transfer sheet for typewriters, listing machines and the like which cause the transfer by impact, or as a ribbon transfer sheet for what are known as Charga-Plate printers used in department stores and automobile service stations. These printers cause the transfer by a squeezing or pressure action. The more satisfactory result may be obtained from the impact and pressure actions by providing what may be termed a "hard" coating for impact printing and a "soft" coating for pressure printing, the terms hard and soft being merely relative and used for identification purposes:

*Hard Coating*

The materials used in the following proportions, by weight, have proved satisfactory for electric typewriter ribbon use.

| | Percent |
|---|---|
| Ferroso-ferric oxide ($Fe_3O_4$) | 33 |
| Castor oil | 7 |
| Paraffin wax | 10 |
| Polyethylene | 50 |

*Soft Coating*

Materials used in the following proportions, by weight, have proved satisfactory for pressure printing.

| | Percent |
|---|---|
| Ferroso-ferric oxide ($Fe_3O_4$) | 36 |
| Castor oil | 14 |
| Paraffin wax | 10 |
| Polyethylene | 40 |

For use with various printing devices having different impact or pressure forces and different sizes and configurations of the contact surfaces of the printing elements, the proportions within the following ranges may be selected.

| | Percent by weight |
|---|---|
| Ferroso-ferric oxide ($Fe_3O_4$) | 25–50 |
| Castor oil | 5–15 |
| Paraffin wax | 5–15 |
| Polyethylene | 35–55 |

In the selection of percentages within the above ranges to arrive at 100% for the whole, and to produce a transfer medium most satisfactory for any given printing device and magnetic reading apparatus, the magnetic material may be within the range of 25–50% by weight, and the vehicle or balance of the material may be within the range of 50–75% by weight.

Any one of several grades of polyethylene may be used but insofar as ease of application of this coating is concerned, it has been found that a polymer of ethylene within the middle or lower range such as 1500 to 2000 molecular weight and melt viscosity of 100 to 200 centipoises at 140° C. is preferable to those of higher molecular weight and melt viscosity.

While ferroso-ferric oxide has been given as an example of a magnetic material that has proved satisfactory, other materials having magnetic properties may be used, such as the gamma form of ferric oxide ($Fe_2O_3$) or a family of ferrites including barium, calcium or manganese ferrite, as well as cobalt boride or domain size metallic iron powder.

*Summary*

One of the outstanding results attained by the present invention is that the transfer of the coating from the base film to paper or other print copy stock is substantially 100%. In fact, examination, under magnification, of the transfer area of the film base after transfer of the numeral such as shown by the white areas of FIG. 3, reveals no perceptible trace of the black coating on the clear area of the film. Furthermore, there is a sharp edge definition of the numeral outline of the film illustrated in FIG. 3, and the transferred numeral configuration on the paper as illustrated in FIG. 2 has equally sharp edge definition. This is particularly important in commercial applications such as bank check processing and credit card charge slip accounting. In automatic bank check processing systems, the customer's account number, transaction code and other information is "pre-printed" on the blank checks in magnetic ink by letter press or other printing machines which are capable of printing sharp and clearly defined symbols. After a check has been written by the customer and is returned to the bank or processing center the dollar amount of the check must be "post-printed" i.e., added in printed form with a magnetic material that can be read electrically along with the pre-printed customer's account number and other information. Machines which are used or easily adaptable for use, as post-printers are of the listing machine type and typewriters employing type elements and a transfer ribbon for imprinting symbols upon the checks. These symbols must be substantially uniform and as nearly equal to the sharply defined pre-printing of the symbols as possible. The transfer medium of the present invention meets these requirements by effecting substantially complete transfer of a smudge-proof magnetic symbol having sharp edge definition.

The way in which these results are attained may be explained as follows: FIGS. 4 and 5 illustrate, in greatly enlarged cross-section, the imprinted numeral 8 in magnetic material shown at 15 and 16 on a print copy base 20 such as a paper check, and the magnetic material which remains at the areas 18, 19 and 20 on the base film 11 of the transfer medium. A type bar 25 is shown in phantom lines at the bottom of FIG. 5 and may be considered to have the form of the numeral 8 employed in this example and shown in cross section for the purpose of illustration.

When the type bar engages (by impact or pressure) upon the surface of the transfer medium, it forces the latter against the paper 20 which is adjacent a platen 21 usually composed of hard rubber or similar resilient material. The force of the impact or pressure depresses the paper and platen and imbeds the pressure area of the symbol or numeral 8 into the paper and in so doing it partially shears or otherwise deforms the area 15 at the pressure area boundaries **15*a* and 15*b*, for example. This greatly reduces the cohesive force of the coating material along the pressure area boundary lines and in so doing subjects the coating symbol configuration to the relative adhesive forces of the coating to the paper document and to the base film 11**.

As the type bar 25 retracts, it releases the transfer medium and permits it to withdraw, under tension, from the surface of the paper to the position shown in FIGS. 4 and 5. The adhesive force between the coating and the paper is greater than the sum of the forces of adhesion to the base film 11 plus the reduced cohesion at the boundary lines **15*a* and 15*b*, thereby causing the symbol area 15 and the corresponding area 16 to separate from the transfer medium. The cohesive force of the coating is greater than the adhesive force of the coating to the base film; therefore, the separation between the latter is complete and the deposit of the coating upon the paper is uniformly distributed at the symbol areas shown in cross section at 15 and 16** (FIG. 4).

There has been described a novel and useful combination of materials which exert adhesive and cohesive forces of such magnitudes that a complete and sharply defined separation of material may be effected.

While the principles of the invention have now been set forth by way of illustration, it will become obvious to those skilled in the art to which the invention pertains that many modifications of the arrangement, proportions, elements, and materials may be made in the use and practice of the invention and otherwise, which are particularly adaptable for specific use without departing from such principles. The appended claims are therefore intended to cover and embrace any such modifications, within the limits only of the true spirit and scope of the invention.

We claim:

1. A transfer medium which is responsive to an impact force for providing a substantially complete and smudge-proof transfer comprising a synthetic film backing coated on one side thereof with a transfer material containing ingredients in substantially the following proportions, by weight, 33% of ferroso-ferric oxide ($Fe_3O_4$), 7% of castor oil, 10% of paraffin wax, and 50% of polyethylene within the middle to lower range of molecular weight and melt viscosity.

2. A transfer medium which is responsive to pressure for providing a substantially complete and smudge-proof transfer comprising, a synthetic film backing coated on one side thereof with a transfer material containing ingredients in substantially the following proportions, by weight, 36% of ferroso-ferric oxide ($Fe_3O_4$), 14% of castor oil, 10% of paraffin wax, and 40% of polyethylene within the middle to lower range of molecular weight and melt viscosity.

3. A transfer medium providing a substantially complete and smudge-proof transfer comprising a synthetic film backing coated on one side thereof with a magnetic transfer material containing ferroso-ferric oxide ($Fe_3O_4$) and a vehicle composed of 5 to 15% castor oil, 5 to 15% paraffin wax, and 35 to 55% of polyethylene within the middle to low range of molecular weight and melt viscosity, the vehicle constituting 50 to 75% of the whole by weight and the ferroso-ferric oxide constituting 25 to 50% of the whole by weight.

4. A transfer medium providing a substantially complete and smudge-proof transfer comprising a synthetic film backing coated with a hot melt of a mixture of a magnetic material and a vehicle of the following proportions by weight, 5 to 15% of castor oil, 5 to 15% of paraffin wax, 35 to 50% of polyethylene within the middle to low range of molecular weight and melt viscosity, the vehicle constituting 50 to 75% of the whole and the magnetic material constituting 25 to 50% of the whole.

References Cited in the file of this patent

UNITED STATES PATENTS

| | | |
|---|---|---|
| 2,318,096 | Quick | May 4, 1943 |
| 2,523,705 | Lovell et al. | Sept. 26, 1950 |
| 2,560,773 | Lovell | July 17, 1951 |
| 2,744,031 | Mumma | Mar. 1, 1956 |
| 2,810,661 | Newman et al. | Oct. 22, 1957 |
| 2,842,508 | Sterk | July 8, 1958 |